US009132832B2

(12) United States Patent
Ichikawa et al.

(10) Patent No.: US 9,132,832 B2
(45) Date of Patent: Sep. 15, 2015

(54) POWER TRANSMISSION DEVICE FOR VEHICLE

(75) Inventors: Akitaka Ichikawa, Nisshin (JP); Yoshimitsu Yokouchi, Okazaki (JP); Masahiro Kojima, Okazaki (JP); Ryuji Ibaraki, Miyoshi (JP); Michitaka Tsuchida, Miyoshi (JP); Shinichiro Suenaga, Susono (JP); Hiromichi Kimura, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/356,826

(22) PCT Filed: Nov. 8, 2011

(86) PCT No.: PCT/JP2011/075754
§ 371 (c)(1),
(2), (4) Date: May 7, 2014

(87) PCT Pub. No.: WO2013/069098
PCT Pub. Date: May 16, 2013

(65) Prior Publication Data
US 2014/0335998 A1 Nov. 13, 2014

(51) Int. Cl.
*F16H 3/72* (2006.01)
*B60W 20/00* (2006.01)
(Continued)

(52) U.S. Cl.
CPC .................. *B60W 20/10* (2013.01); *B60K 6/26* (2013.01); *B60K 6/445* (2013.01); *B60W 10/02* (2013.01); *B60W 10/08* (2013.01); *F16D 3/06* (2013.01); *F16H 57/0006* (2013.01); *B60W 2030/206* (2013.01); *B60W 2510/0241* (2013.01);
(Continued)

(58) Field of Classification Search
None
See application file for complete search history.

(56) References Cited

U.S. PATENT DOCUMENTS 5,653,321 A * 8/1997 Takaoka et al. ............ 192/70.17
5,967,940 A   10/1999 Yamaguchi
(Continued)

FOREIGN PATENT DOCUMENTS

JP  11-093725 A  4/1999
JP  2000085385 A  3/2000
(Continued)

*Primary Examiner* — Dirk Wright
(74) *Attorney, Agent, or Firm* — Sughrue Mion, PLLC

(57) ABSTRACT

A vehicle power transmission device is disposed on a hybrid vehicle having an engine and an electric motor, the vehicle power transmission device includes a first member having one of outer circumferential teeth disposed around one axial center or inner circumferential teeth meshing with the outer circumferential teeth and a second member having the other teeth, the inner circumferential teeth and the outer circumferential teeth meshes with each other to limit relative rotation around the one axial center between the first member and the second member, the relative rotation between the first member and the second member is limited to transmit torque of the electric motor to drive wheels.

The vehicle power transmission device comprises: a sliding member sliding relative to at least one of the first member and the second member while generating frictional resistance as the first member and the second member relatively rotate within a range corresponding to a circumferential gap between the outer circumferential teeth and the inner circumferential teeth, the sliding member being a hollow elastic body, the sliding member sliding relative to at least one of the first member and the second member depending on magnitude of the torque of the electric motor.

4 Claims, 7 Drawing Sheets

(51) Int. Cl.
*B60K 6/26* (2007.10)
*B60K 6/445* (2007.10)
*B60W 10/02* (2006.01)
*B60W 10/08* (2006.01)
*F16D 3/06* (2006.01)
*F16H 57/00* (2012.01)
*B60W 30/20* (2006.01)
*F16D 1/10* (2006.01)

(52) U.S. Cl.
CPC ...... *B60W2510/08* (2013.01); *F16D 2001/103* (2013.01); *Y02T 10/6239* (2013.01); *Y10T 477/26* (2015.01)

(56) References Cited

U.S. PATENT DOCUMENTS

| | | | |
|---|---|---|---|
| 6,340,339 | B1 | 1/2002 | Tabata et al. |
| 7,651,425 | B2 * | 1/2010 | Shimizu .......................... 475/5 |
| 8,038,569 | B2 * | 10/2011 | Yokouchi et al. ............ 475/327 |
| 8,858,377 | B2 * | 10/2014 | Iwasa ................................ 475/5 |
| 2002/0165059 | A1 | 11/2002 | Supina et al. |
| 2002/0177503 | A1 * | 11/2002 | Beyerlein ...................... 475/331 |
| 2003/0183467 | A1 | 10/2003 | Kozarekar |
| 2004/0043861 | A1 | 3/2004 | Supina et al. |
| 2004/0112654 | A1 | 6/2004 | Kozarekar et al. |
| 2004/0166980 | A1 | 8/2004 | Supina et al. |
| 2004/0176203 | A1 | 9/2004 | Supina et al. |
| 2006/0116231 | A1 | 6/2006 | Supina et al. |
| 2006/0166774 | A1 | 7/2006 | Supina et al. |
| 2008/0026898 | A1 | 1/2008 | Supina et al. |
| 2010/0049390 | A1 | 2/2010 | Supina et al. |

FOREIGN PATENT DOCUMENTS

| | | |
|---|---|---|
| JP | 2002-081542 A | 3/2002 |
| JP | 2003-314614 A | 11/2003 |
| JP | 2005-308094 A | 11/2005 |
| JP | 2008-201351 A | 9/2008 |
| JP | 2009113743 A | 5/2009 |
| JP | 2011-214646 A | 10/2011 |

* cited by examiner

POWER TRANSMISSION DEVICE FOR VEHICLE

CROSS REFERENCE TO RELATED APPLICATIONS

This application is a National Stage of International Application No. PCT/JP2011/075754 filed Nov. 8, 2011, the contents of all of which are incorporated herein by reference in their entirety.

TECHNICAL FIELD

The present invention relates to a technique of reducing abnormal noise generated from a drive system of a hybrid vehicle.

BACKGROUND ART

A vehicle power transmission device is conventionally well known that is disposed and that can reduce tooth-hitting noise of gear teeth disposed on a drive system of a hybrid vehicle and colliding with each other. For example, this corresponds to a vehicle power transmission device of each of Patent Documents 1 and 2. In these vehicle power transmission devices, the reduction in the tooth-hitting noise is achieved by a control device controlling the vehicle power transmission device and the control device changes an operation point of an engine for the reduction in the tooth-hitting noise. For example, the control device of Patent Document 1 controls an engine rotation speed to a predetermined value or higher if a condition of occurrence of the tooth-hitting noise is detected in the vehicle power transmission device. Controlling the engine in this way prevents the engine from being operated in an area associated with larger torque variation and the tooth-hitting noise is reduced.

PRIOR ART DOCUMENTS

Patent Documents

Patent Document 1: Japanese Laid-Open Patent Publication No. 11-093725
Patent Document 2: Japanese Laid-Open Patent Publication No. 2008-201351

SUMMARY OF THE INVENTION

Problem to be Solved by the Invention

In Patent Documents 1 and 2, as described above, the reduction in the tooth-hitting noise is achieved by control provided by a control device. Since the tooth-hitting noise easily occurs in a hybrid vehicle when a torque of an electric motor for running (electric motor torque) is zero or substantially zero, control of increasing a change rate of the electric motor torque in the vicinity of the electric motor torque of zero is provided in the course of change in the electric motor torque with inversion of positivity/negativity thereof so as to achieve the reduction in the tooth-hitting noise. Although the reduction in the tooth-hitting noise is achieved by the control of the engine or the electric motor in the conventional technique as described above, since the engine or the electric motor is controlled with priority given to the reduction in the tooth-hitting noise, deterioration of fuel efficiency or drivability may be caused in exchange for the reduction in the tooth-hitting noise. Such a problem is unknown.

The present invention was conceived in view of the situations and it is therefore an object of the present invention to provide a vehicle power transmission device capable of reducing tooth-hitting noise in a drive system without causing deterioration in fuel efficiency or drivability of a vehicle.

Means for Solving the Problem

To achieve the object, the first aspect of the invention provides (a) a vehicle power transmission device disposed on a hybrid vehicle having an engine and an electric motor, the vehicle power transmission device including a first member having one of outer circumferential teeth disposed around one axial center or inner circumferential teeth meshing with the outer circumferential teeth and a second member having the other teeth, the inner circumferential teeth and the outer circumferential teeth meshing with each other to limit relative rotation around the one axial center between the first member and the second member, the relative rotation between the first member and the second member being limited to transmit torque of the electric motor to drive wheels, the vehicle power transmission device comprising: (b) a sliding member sliding relative to at least one of the first member and the second member while generating frictional resistance as the first member and the second member relatively rotate within a range corresponding to a circumferential gap between the outer circumferential teeth and the inner circumferential teeth, (c) the sliding member sliding relative to at least one of the first member and the second member depending on magnitude of the torque of the electric motor.

Effects of the Invention

Although the inner circumferential teeth and the outer circumferential teeth may tend to vibrate with each other in circumferential directions, depending on magnitude of the torque of the electric motor in the vehicle power transmission device, as described in the first aspect of the invention, since the inner circumferential teeth and the outer circumferential teeth are restrained from vibrating with each other in the circumferential directions by the frictional resistance generated by the sliding of the sliding member, a tooth hitting noise can be reduced that is attributable to the inner circumferential teeth and the outer circumferential teeth vibrating with each other in the circumferential directions. Since the torque of the engine or the electric motor is not controlled for reducing the tooth hitting noise and the sliding member only slides within a minute sliding stroke corresponding to the circumferential gap between the outer circumferential teeth and the inner circumferential teeth when a relative rotation direction between the first member and the second member is reversed, almost no energy loss is caused by the sliding and the reduction in the tooth hitting noise can be achieved without causing deterioration in fuel efficiency or drivability of the vehicle. The fuel efficiency refers to, for example, a running distance per unit fuel consumption etc., and improvement in fuel efficiency refers to extension of the running distance per unit fuel consumption, or a decrease in fuel consumption rate (=fuel consumption/drive wheel output) of the vehicle as a whole. Contrarily, reduction (deterioration) in fuel efficiency refers to shortening of the running distance per unit fuel consumption or an increase in fuel consumption rate of the vehicle as a whole.

The second aspect of the invention provides the vehicle power transmission device recited in the first aspect of the invention, wherein when the electric motor is in an idling state, the sliding member slides relative to at least one of the first member and the second member. Consequently, since the tooth hitting noise tends to occur when the electric motor is in the idling state, the reduction in the tooth hitting noise can effectively be achieved. As compared to the case that the sliding member always slides, wear of the sliding member can be suppressed.

The third aspect of the invention provides the vehicle power transmission device recited in the first or second aspect of the invention, wherein (a) the first member includes a driving gear, wherein (b) a driven gear mutually meshing with the driving gear is disposed on a transmission shaft making up a portion of a power transmission path from the engine to the drive wheels, wherein (c) the second member includes an electric motor rotor shaft relatively non-rotatably fixed to a rotor of the electric motor, and wherein (d) the sliding member is pressed by the first member and the second member. Consequently, a configuration of setting the frictional resistance due to the sliding of the sliding member to proper magnitude can easily be established in the vehicle power transmission device having a structure of transmitting the torque of the electric motor from the driving gear to the driven gear.

The fourth aspect of the invention provides the vehicle power transmission device recited in the third aspect of the invention, wherein the rotor of the electric motor has an inertia moment around the one axial center larger than the first member. Consequently, as compared to the case that the rotor of the electric motor has the inertia moment smaller than, for example, the first member, the larger inertia moment can be applied to the first member by the sliding of the sliding member. As a result, for example, the tooth hitting noise generated between the driven gear and the driving gear is reduced and pulsation of engine torque transmitted by the transmission shaft is suppressed.

The fifth aspect of the invention provides the vehicle power transmission device recited in the first or second aspect of the invention, wherein (a) the first member is a carrier included in a planetary gear device outputting power of the electric motor input to a sun gear, from a ring gear toward the drive wheels, wherein (b) the second member is a non-rotating member, and wherein (c) the sliding member is pressed by the first member and the second member. Consequently, a configuration of setting the frictional resistance due to the sliding of the sliding member to proper magnitude can easily be established in the vehicle power transmission device having a structure of supplying the power of the electric motor to the drive wheels via the planetary gear device.

The sixth aspect of the invention provides the vehicle power transmission device recited in any one of the first to fifth aspects of the invention, wherein the sliding member is an elastic body. Consequently, it is advantageous that the sliding member may not have complicated structure and that the frictional resistance of the sliding member is easily set to magnitude appropriate for achieving the reduction in the tooth hitting noise.

The seventh aspect of the invention provides the vehicle power transmission device recited in any one of the first to sixth aspects of the invention, wherein (a) the outer circumferential teeth and the inner circumferential teeth are not included in the power transmission path from the engine to the drive wheels, and wherein (b) the torque of the electric motor is supplied to the power transmission path by limiting relative rotation between the first member and the second member. Consequently, the outer circumferential teeth and the inner circumferential teeth tend to generate the tooth hitting noise when the torque of the electric motor is zero or substantially zero and the tooth hitting noise can properly be reduced in such a configuration.

Preferably, a surface of the sliding member is made up of a rough surface.

Preferably, the first member and the second member are spline-fitted by meshing the outer circumferential teeth and the inner circumferential teeth with each other.

MODE FOR CARRYING OUT THE INVENTION

An example of the present invention will now be described in detail with reference to the drawings.

First Example

Figure 1:
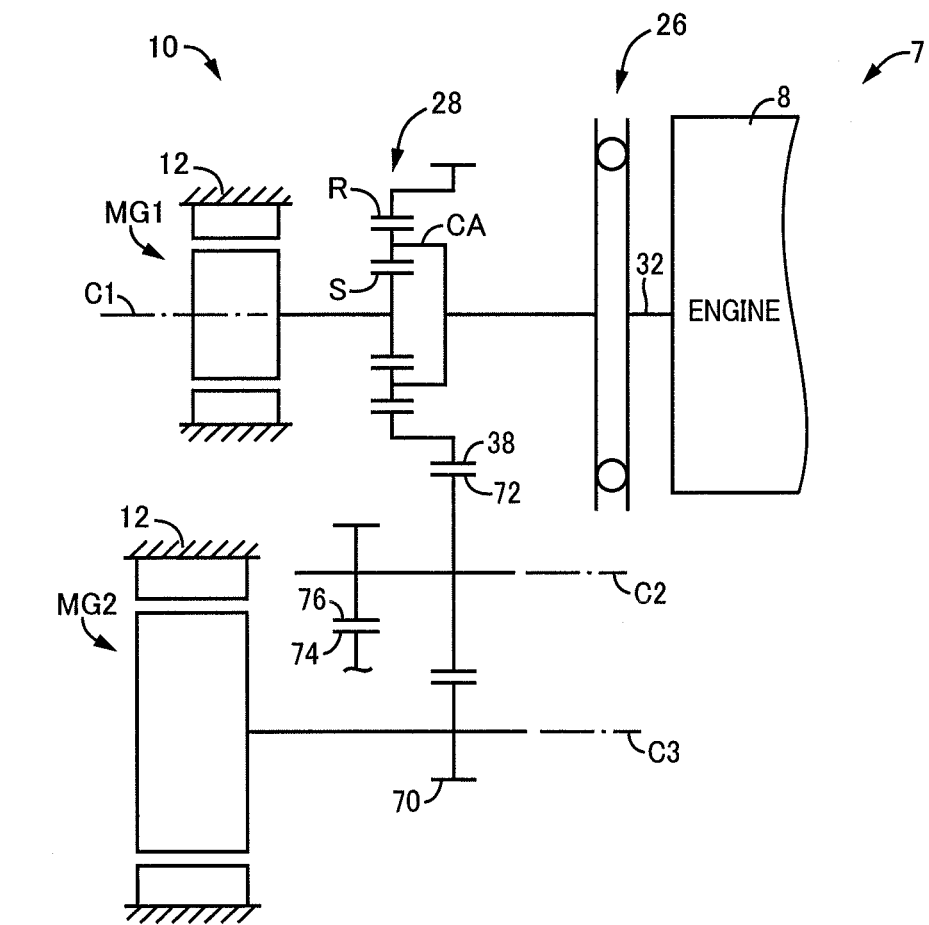
FIG. 1 is a schematic for explaining a structure of a hybrid vehicle in the first example to which the present invention is applied.
Figure 1:
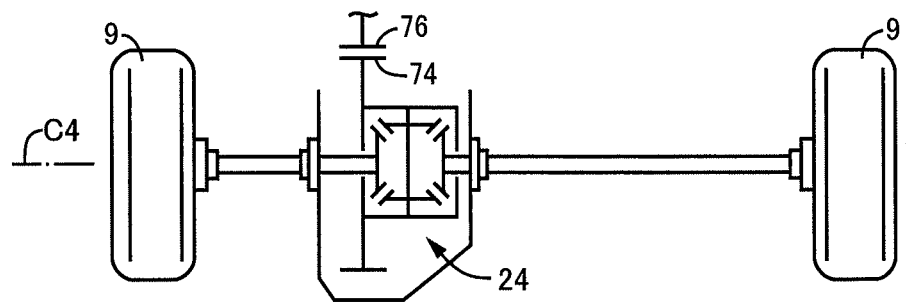
Figure 2:
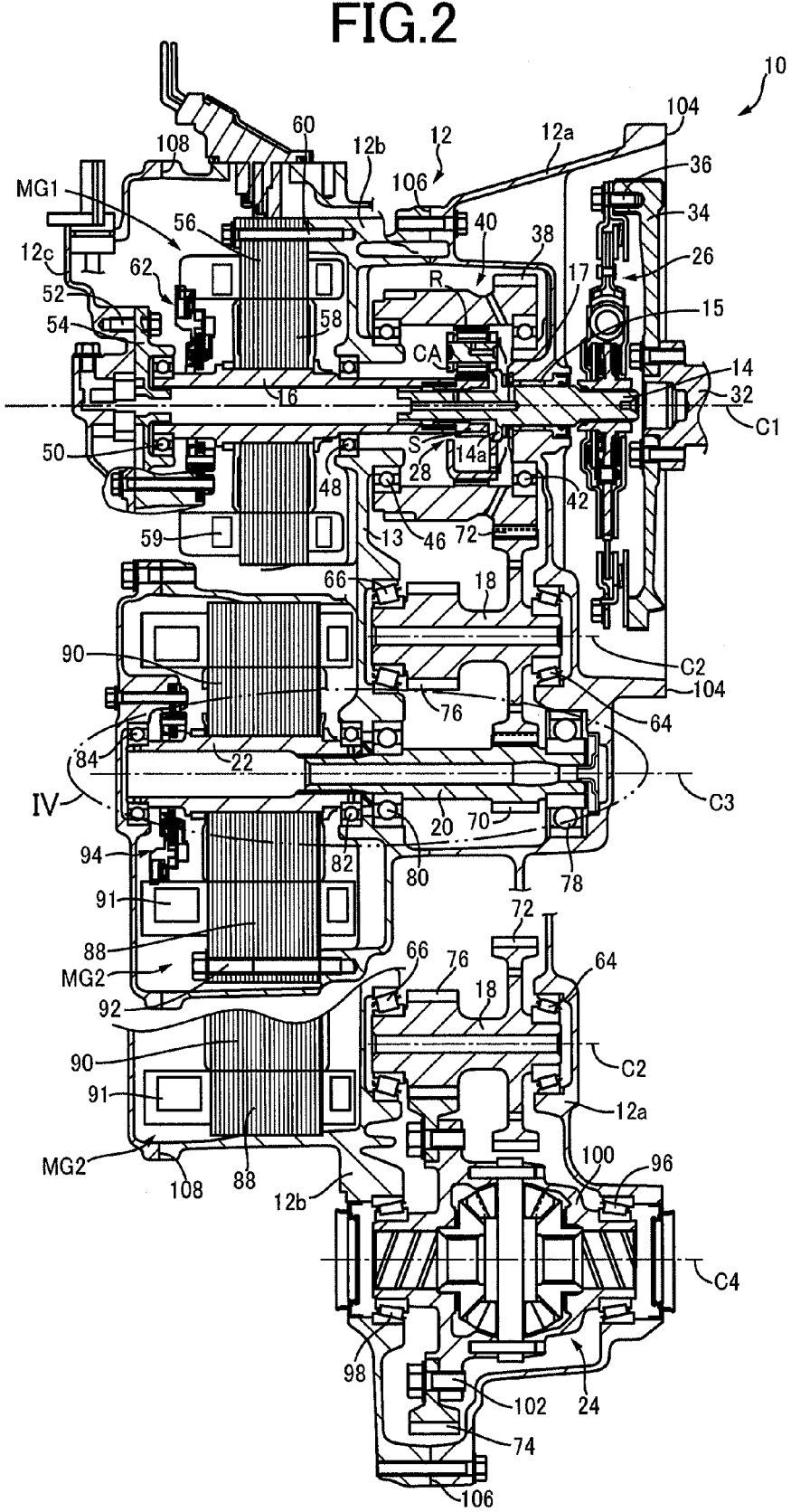
FIG. 2 is a cross-sectional view for explaining a structure of a hybrid vehicle drive device included in the hybrid vehicle of FIG. 1.

FIG. 1 is a schematic for explaining a structure of a hybrid vehicle 6 (hereinafter referred to as a vehicle 6) to which the present invention is applied. FIG. 2 is a cross-sectional view for explaining a structure of a hybrid vehicle drive device 7 (hereinafter referred to as a drive device 7) included in the vehicle 6. The drive device 7 includes an engine 8 such as known gasoline and diesel engines acting as a drive force source for running, and a vehicle power transmission device 10 (hereinafter referred to as a power transmission device 10) transmitting power of the engine 8 to drive wheels 9. As depicted in FIG. 2, the power transmission device 10 includes four rotation axial centers (C1 to C4) parallel to each other in a casing 12 that is a casing body of the power transmission device 10. The first axial center C1 is coincident with a rotation axial center of the engine 8 and, on the first axial center C1, an input shaft 14, a power distribution mechanism 28, and a first rotor shaft 16 of a first electric motor MG1 are rotatably supported. On the second axial center C2, a counter shaft 18 is rotatably disposed. On the third axial center C3, a power transmission shaft 20 and a second rotor shaft 22 of a second electric motor MG2 are rotatably supported. On the fourth axial center C4, a differential gear device, i.e., a differential gear 24 is rotatably supported. The second electric motor MG2 corresponds to an electric motor of the present invention and the third axial center C3 corresponds to one axial center of the present invention. The power transmission shaft 20 corresponds to a first member of the present invention; the second rotor shaft 22 corresponds to a second member and an electric motor rotor shaft of the present invention; and the counter shaft 18 corresponds to a transmission shaft of the present invention.

The casing 12 is a non-rotating member made up of three case members, which are a housing 12a, a case 12b, and a cover 12c, and the case members are fastened at axial end surfaces (mating surfaces) by bolts to make up one casing 12. The case 12b has a partition wall 13 substantially perpendicular to the rotation axial centers.

The input shaft 14 is relatively rotatably supported via a needle roller bearing 15 and a thrust bearing 17 by the housing 12a making up the casing 12.

A damper device 26 and the power distribution mechanism 28 consisting of a planetary gear device are disposed on an outer circumferential side of the input shaft 14. The damper device 26 absorbs torque variation transmitted from the engine 8 and is interposed between the engine 8 and the input shaft 14 in a power transmittable manner. The damper device 26 has an outer circumferential portion fastened by a bolt 36 to a disk-shaped flywheel 34 coupled to a crankshaft 32 of the engine 8 and has an inner circumferential portion spline-fitted to one axial end of the input shaft 14.

The power distribution mechanism 28 is mainly made up of a sun gear S and a ring gear R rotatable around the first axial center C1 and a carrier CA rotatably and revolvably supporting a pinion gear meshing therewith. The sun gear S is relatively non-rotatably coupled to the first rotor shaft 16 by spline fitting and the carrier CA is relatively non-rotatably connected to a flange portion 14a radially extending from the input shaft 14. The ring gear R is formed in an inner circumferential portion of a composite gear shaft 40 provided with a counter drive gear 38 described later.

The composite gear shaft 40 is relatively rotatably supported via a first bearing 42 and a second bearing 46 by the casing 12. Specifically, the first bearing 42 is disposed on an inner circumferential end portion of the composite gear shaft 40 closer to the damper device 26 in the axial direction, and the composite gear shaft 40 is relatively rotatably supported via the first bearing 42 by the housing 12a. The second bearing 46 is disposed on an inner circumferential end portion of the composite gear shaft 40 closer to the first electric motor MG1 in the axial direction, and the composite gear shaft 40 is relatively rotatably supported via the second bearing 46 by the partition wall 13 of the case 12b.

The first rotor shaft 16 is relatively rotatably supported via a third bearing 48 and a fourth bearing 50 by the casing 12. Specifically, the third bearing 48 is disposed on an outer circumferential portion of the first rotor shaft 16 near an intermediate portion in the axial direction, and the first rotor shaft 16 is relatively rotatably supported via the third bearing 48 by the partition wall 13 of the case 12b. The fourth bearing 50 is disposed on an outer circumferential end portion of the first rotor shaft 16 closer to the cover 12c in the axial direction, and the first rotor shaft 16 is relatively rotatably supported via the fourth bearing 50 by a cover member 54 fixed to the cover 12c by a bolt 52. The third bearing 48 has an outer ring pressed into (is subjected to outer-ring press-fitting into) the partition wall 13 of the case 12b.

The first electric motor MG1 is disposed on an outer circumferential side of the first rotor shaft 16. The first electric motor MG1 mainly includes a stator 56, a rotor 58, and a coil end 59. The first electric motor MG1 is a so-called motor generator having a motor function and an electric generation function. The stator 56 of the first electric motor MG1 is non-rotatably fixed by a bolt 60 to the casing 12 (case 12b). An inner circumferential portion of the rotor 58 is relatively non-rotatably fixed to the first rotor shaft 16. Therefore, rotation of the first electric motor MG1 is transmitted to the first rotor shaft 16. A resolver 62 for detecting a rotation speed of the first rotor shaft 16, i.e., a rotation speed of the first electric motor MG1, is fixed to the cover 12c.

The counter shaft 18 disposed on the second axial center C2 is relatively rotatably supported via a fifth bearing 64 and a sixth bearing 66 by the casing 12. Specifically, the fifth bearing 64 is disposed on an outer circumferential end portion of the counter shaft 18 closer to the housing 12a in the axial direction, and the counter shaft 18 is relatively rotatably supported via the fifth bearing 64 by the housing 12a. The sixth bearing 66 is disposed on an outer circumferential end portion of the counter shaft 18 closer to the case 12b in the axial direction, and the counter shaft 18 is relatively rotatably supported via the sixth bearing 66 by the partition wall 13 of the case 12b. The sixth bearing 66 has an outer ring pressed into (is subjected to outer-ring press-fitting into) the partition wall 13 of the case 12b.

A counter driven gear 72 is formed on the counter shaft 18 on the housing 12a side in the axial direction and meshes with each of the counter drive gear 38 formed on the composite gear shaft 40 and a reduction gear 70 described later. A differential drive gear 76 is formed on the counter shaft 18 on the case 12b side in the axial direction and meshes with a differential ring gear 74 described later. The counter drive gear 38, the reduction gear 70, the counter driven gear 72 meshing therewith, the differential ring gear 74, and the differential drive gear 76 meshing therewith are all formed to have helical teeth. Therefore, all of these gears 38, 70, 72, 74, and 76 are helical gears. The reduction gear 70 corresponds to a driving gear of the present invention and the counter driven gear 72 corresponds to a driven gear of the present invention.

The power transmission shaft 20 disposed on the third axial center C3 is relatively rotatably supported via a seventh bearing 78 and a eighth bearing 80 by the casing 12. Specifically, the seventh bearing 78 is disposed on an outer circumferential end portion of the power transmission shaft 20 closer to the housing 12a in the axial direction, and the power transmission shaft 20 is relatively rotatably supported via the seventh bearing 78 by the housing 12a. The eighth bearing 80 is disposed on an outer circumferential end portion of the power transmission shaft 20 closer to the case 12b in the axial direction, and the power transmission shaft 20 is relatively rotatably supported via the eighth bearing 80 by the partition wall 13 of the case 12b.

The reduction gear 70 meshing with the counter driven gear 72 is formed on the power transmission shaft 20. An end portion of the power transmission shaft 20 closer to the eighth bearing 80 in the axial direction is relatively non-rotatably spline-fitted to the second rotor shaft 22. The second rotor shaft 22 is relatively rotatably supported via a ninth bearing 82 and a tenth bearing 84 by the casing 12. Specifically, the ninth bearing 82 is disposed on an outer circumferential end portion of the second rotor shaft 22 closer to the power transmission shaft 20 in the axial direction, and the second rotor shaft 22 is relatively rotatably supported via the ninth bearing 82 by the partition wall 13 of the case 12b. The tenth bearing 84 is disposed on an outer circumferential end portion of the second rotor shaft 22 closer to the cover 12c in the axial direction, and the second rotor shaft 22 is relatively rotatably supported via the tenth bearing 84 by the cover 12c. An outer ring of the ninth bearing 82 is pressed into (subjected to outer-ring press-fitting into) the partition wall 13 of the case 12b.

The second electric motor MG2 is disposed on an outer circumferential side of the second rotor shaft 22. The second electric motor MG2 mainly includes a stator 88, a rotor 90, and a coil end 91. The second electric motor MG2 is a so-called motor generator having a motor function and an electric generation function as is the case with the first electric motor MG1. The stator 88 of the second electric motor MG2 is non-rotatably fixed by a bolt 92 to the casing 12 (case 12b). An inner circumferential portion of the rotor 90 is relatively non-rotatably fixed to the second rotor shaft 22. Therefore, rotation of the second electric motor MG2 is transmitted to the second rotor shaft 22. Since the second rotor shaft 22 is spline-fitted to the power transmission shaft 20, rotation of the second rotor shaft 22 is transmitted to the reduction gear 70. A resolver 94 for detecting a rotation speed of the second rotor shaft 22, i.e., a rotation speed of the second electric motor MG2, is fixed to the cover 12c. The second electric motor MG2 has the rotor 90 disposed radially outside the second rotor shaft 22 and a weight of the rotor 90 is extremely larger as compared to the power transmission shaft 20. Therefore, the rotor 90 has the inertia moment around the third axial center C3 extremely larger than the power transmission shaft 20. The rotor 90 and the second rotor shaft 22 integrally rotating obviously have the total inertia moment around the third axial center C3 extremely larger than the power transmission shaft 20. For example, if the second electric motor MG2 is idling, the rotor 90 and the second rotor shaft 22 act as a flywheel.

The differential gear 24 disposed on the fourth axial center C4 and acting as a differential mechanism is relatively rotatably supported via an eleventh bearing 96 and a twelfth bearing 98 by the casing 12. Specifically, one axial outer circumferential end of a differential case 100 making up the differential gear 24 is relatively rotatably supported via the eleventh bearing 96 by the housing 12a, and the other axial outer circumferential end of the differential case 100 is relatively rotatably supported via the twelfth bearing 98 by the case 12b. The differential ring gear 74 meshing with the differential drive gear 76 is fixed by a bolt 102 to an outer circumference of the differential case 100. The specific configuration and operation of the differential gear 24 is known and will not be described.

Figure 3:
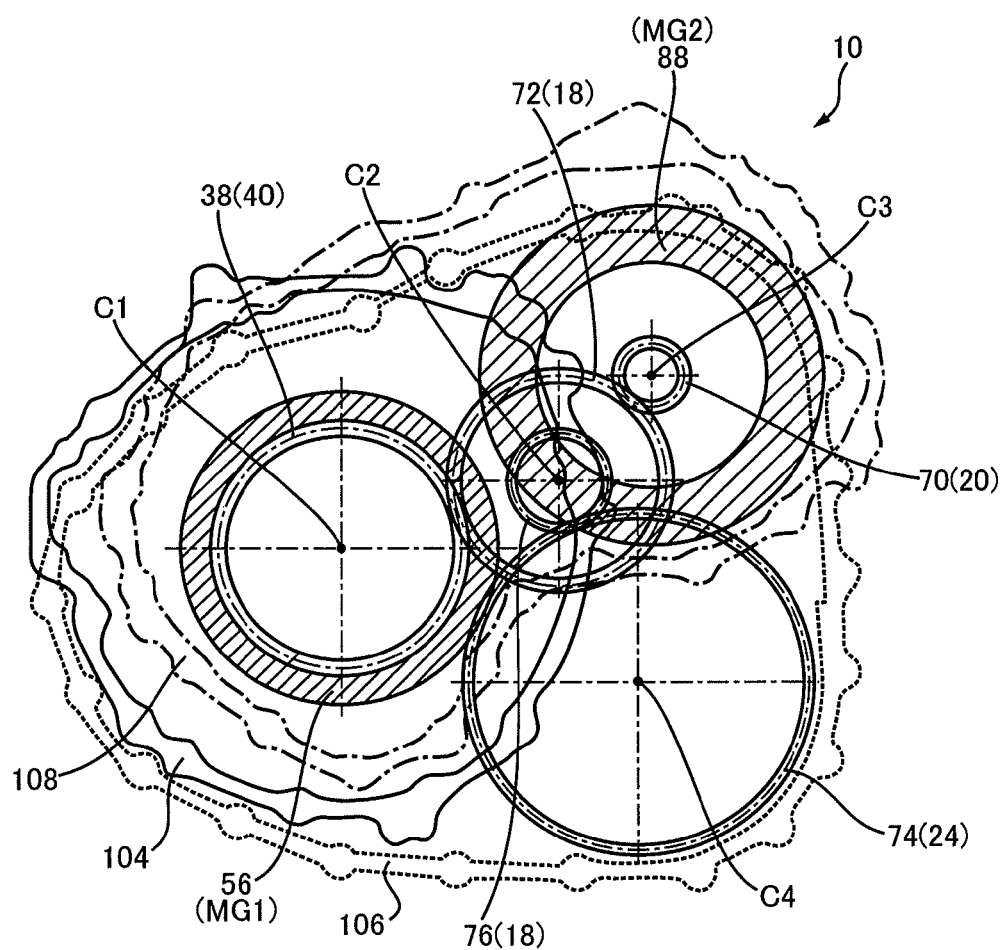
FIG. 3 corresponds to a diagram when the vehicle power transmission device of FIG. 2 is viewed from a direction parallel to the axial centers and is a simplified diagram of arrangement positions of the counter shaft, the power transmission shaft, the differential gear, the composite gear shaft, the first electric motor, and the second electric motor and arrangement positions of the axial centers.

The differential gear 24 meshing with the differential drive gear 76 is depicted as a separate view because the first to fourth axial centers C1 to C4 are actually not arranged on one plane. Specifically, the axial centers C1 to C4 are arranged as depicted in FIG. 3. FIG. 3 is a simplified diagram of arrangement positions of the counter shaft 18, the power transmission shaft 20, the differential gear 24, the composite gear shaft 40, the first electric motor MG1, and the second electric motor MG2 and arrangement positions of the axial centers C1 to C4, corresponding to a diagram when the power transmission device 10 of FIG. 2 is viewed from a direction parallel to the axial centers. In FIG. 3, the upper side corresponds to a vertically upper side of the vehicle 6. In FIG. 3, a mating surface 104 between the housing 12a depicted in FIG. 2 and an engine case not depicted is represented by a surrounding solid line. A mating surface 106 between the housing 12a and the case 12b depicted in FIG. 2 is represented by a surrounding broken line. A mating surface 108 between the case 12b and the cover 12c is represented by a surrounding dashed-dotted line.

As depicted in FIG. 3, the third axial center C3 acting as a rotation axial center of the second electric motor MG2 and the power transmission shaft 20 is located vertically uppermost and the fourth axial center C4 acting as a rotation axial center of the differential gear 24 is located vertically lowermost. The second axial center C2 acting as a rotation axial center of the counter shaft 18 is positioned in an area surrounded by the first axial center C1, the third axial center C3, and the fourth axial center C4. Both the counter drive gear 38 and the reduction gear 70 are meshed with the counter driven gear 72, and the differential drive gear 76 and the differential ring gear 74 are meshed with each other.

In the power transmission device 10 configured as described above, the power of the engine 8 is input via the damper device 26 to the input shaft 14 and is transmitted from the input shaft 14 sequentially through the power distribution mechanism 28, the counter shaft 18, the differential gear 24, a pair of axles, etc., to a pair of the drive wheels 9. Therefore, the input shaft 14, the power distribution mechanism 28, the counter shaft 18, and the differential gear 24 make up an engine power transmission path that is a power transmission path from the engine 8 to the drive wheels 9. The power distribution mechanism 28 has a differential state controlled by the first electric motor MG1 coupled to the sun gear S, thereby acting as an electric continuously variable transmission. Torque of the second electric motor MG2, i.e., power of the second electric motor MG2, is supplied via the reduction gear 70 and the counter driven gear 72 meshing with each other, to the counter shaft 18 making up a portion of the engine power transmission path. Therefore, the power of the second electric motor MG2 is transmitted from the second rotor shaft 22 sequentially through the power transmission shaft 20, the counter shaft 18, the differential gear 24, and a pair of the axles, etc., to the pair of the drive wheels 9.

Figure 4:
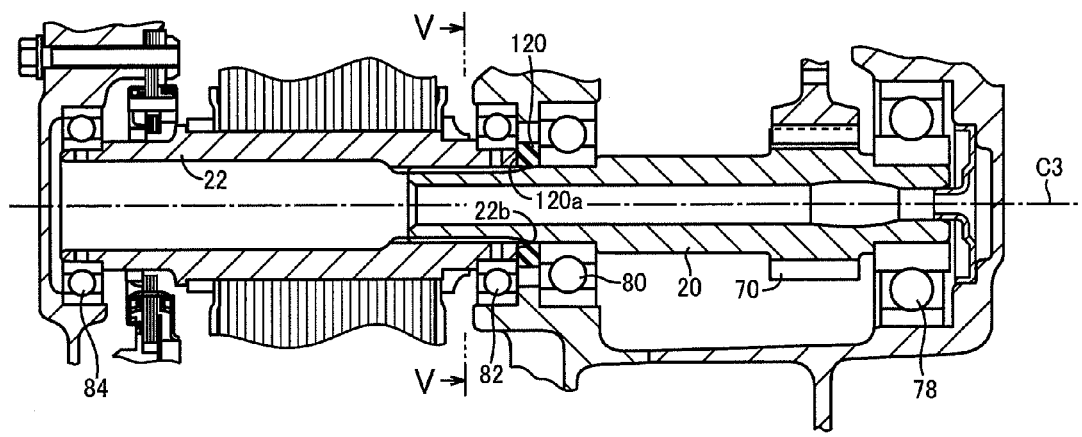
FIG. 4 is an enlarged cross-sectional view of a portion IV near the third axial center of FIG. 2.
Figure 5:
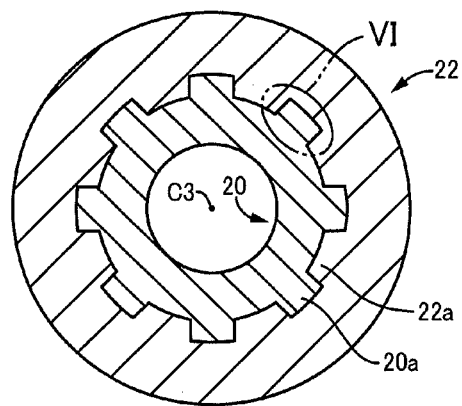
FIG. 5 is a cross-sectional view of a spline fitting portion between the power transmission shaft and the second rotor shaft of FIG. 4, i.e., a cross-sectional view of the power transmission shaft and the second rotor shaft viewed along V-V of FIG. 4.
Figure 6:
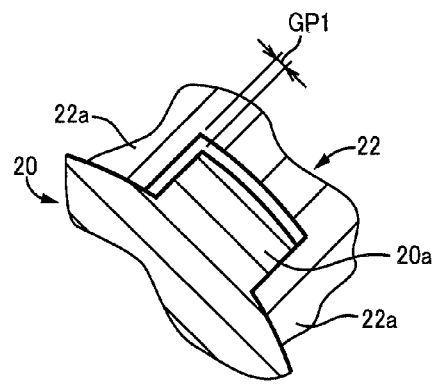
FIG. 6 is an enlarged view of a portion VI of FIG. 5.

FIG. 4 is an enlarged cross-sectional view of a portion IV near the third axial center C3 of FIG. 2. FIG. 5 is a cross-sectional view of a spline fitting portion between the power transmission shaft 20 and the second rotor shaft 22, i.e., a cross-sectional view of the power transmission shaft 20 and the second rotor shaft 22 viewed along V-V of FIG. 4. FIG. 6 is an enlarged view of a portion VI of FIG. 5. The power transmission shaft 20 and the second rotor shaft 22 are spline-fitted to each other as described with reference to FIG. 2 and the spline fitting will be described in detail with reference to FIG. 4 etc. As depicted in FIG. 5, the power transmission shaft 20 includes a plurality of outer circumferential teeth 20a arranged around the third axial center C3 and the second rotor shaft 22 includes a plurality of inner circumferential teeth 22a arranged around the third axial center C3. The outer circumferential teeth 20a and the inner circumferential teeth 22a mesh with each other, and the mashing between the outer circumferential teeth 20a and the inner circumferential teeth 22a makes up the spline fitting. The spline fitting between the power transmission shaft 20 and the second rotor shaft 22 is loose fitting and, as depicted in FIG. 6, a minute gap GP1 (hereinafter referred to as a circumferential gap GP1) exists in a circumferential direction around the third axial center C3 between the outer circumferential teeth 20a and the inner circumferential teeth 22a. Therefore, it has been described that the power transmission shaft 20 is relatively non-rotatably spline-fitted to the second rotor shaft 22 in the description of FIG. 2; however, strictly speaking, the power transmission shaft 20 and the second rotor shaft 22 are rotatable around the third axial center C3 within a range corresponding to the circumferential gap GP1. In other words, accurately describing the spline fitting between the power transmission shaft 20 and the second rotor shaft 22, relative rotation around the third axial center C3 between the power transmission shaft 20 and the second rotor shaft 22 is limited by the outer circumferential teeth 20a and the inner circumferential teeth 22a meshing with each other. The torque of the second electric motor MG2 is transmitted to the drive wheels 9 by the limitation of the relative rotation between the power transmission shaft 20 and the second rotor shaft 22, i.e., the spline fitting between the power transmission shaft 20 and the second rotor shaft 22.

As depicted in FIG. 4, the power transmission device 10 includes an annular sliding member 120 between an end surface 22b of the second rotor shaft 22 closer to the reduction gear 70 and the eighth bearing 80 and on an outer circumference of the power transmission shaft 20. The sliding member 120 has a rectangular cross section, for example, and is made up of an elastic body such as high wear resistance rubber. To increase frictional resistance at the time of sliding, a surface of the sliding member 120 is made up of a rough surface. The sliding member 120 is disposed on the same axial center as the power transmission shaft 20 such that the power transmission shaft 20 is pressed into an inner circumferential hole of the sliding member 120 and, as a result, the sliding member 120 integrally turns or rotates with the power transmission shaft 20. To acquire frictional resistance at the time of sliding, the sliding member 120 is pressed by the power transmission shaft 20 and the second rotor shaft 22 such that the sliding member 120 is compressed in a direction parallel to the third axial center C3. FIG. 4 depicts that the sliding member 120 is pressed against the power transmission shaft 20 via an inner ring of the eighth bearing 80.

Since the sliding member 120 is mounted on the third axial center C3 in this way, the sliding member 120 slightly slides while generating frictional resistance to the second rotor shaft 22 as the power transmission shaft 20 and the second rotor shaft 22 relatively rotate around the third axial center C3 within the range corresponding to the circumferential gap GP1 (see FIG. 6). In particular, the end surface 22b of the second rotor shaft 22 closer to the sliding member 120 and a side surface 120a of the sliding member 120 facing the end surface 22b slide relative to each other in the circumferential direction around the third axial center C3. However, during a driving or a regenerative operation of the second electric motor MG2, if torque is transmitted between the power transmission shaft 20 and the second rotor shaft 22, the outer circumferential teeth 20a and the inner circumferential teeth 22a are pressed to each other in one of the circumferential directions and, therefore, the sliding member 120 does not slide relative to the second rotor shaft 22. Thus, the sliding member 120 slides relative to the second rotor shaft 22 depending on magnitude of the torque of the second electric motor MG2. Specifically, when the second electric motor MG2 is idling, the sliding member 120 slides relative to the second rotor shaft 22.

The power transmission device 10 of this example has the following effects (A1) to (A6). (A1) According to this example, the power transmission shaft 20 and the second rotor shaft 22 are spline-fitted in a loose-fitting manner by meshing the outer circumferential teeth 20a of the power transmission shaft 20 and the inner circumferential teeth 22a of the second rotor shaft 22 with each other. Because the outer circumferential teeth 20a and the inner circumferential teeth 22a mesh with each other, i.e., the spline fitting is formed, the relative rotation (relative turning) around the third axial center C3 is limited between the power transmission shaft 20 and the second rotor shaft 22. In the power transmission device 10, the torque of the second electric motor MG2 is transmitted to the drive wheels 9 by the limitation of the relative rotation between the power transmission shaft 20 and the second rotor shaft 22, i.e., the spline fitting. The sliding member 120 included in the power transmission device 10 slides while generating frictional resistance to the second rotor shaft 22 as the power transmission shaft 20 and the second rotor shaft 22 relatively rotate within the range corresponding to the circumferential gap GP1 (see FIG. 6) between the outer circumferential teeth 20a and the inner circumferential teeth 22a. Specifically, the sliding member 120 slides relative to the second rotor shaft 22 depending on magnitude of the torque of the second electric motor MG2. Therefore, although the outer circumferential teeth 20a and the inner circumferential teeth 22a may tend to vibrate with each other in circumferential directions due to torque pulsation of the engine 8 etc., depending on magnitude of the torque of the second electric motor MG2 in the power transmission device 10, since the outer circumferential teeth 20a and the inner circumferential teeth 22a are restrained from vibrating with each other in the circumferential directions by the frictional resistance generated by the sliding of the sliding member 120, a tooth hitting noise can be reduced that is attributable to the outer circumferential teeth 20a and the inner circumferential teeth 22a vibrating with each other in the circumferential directions. Since an operation point of the engine 8 or the second electric motor MG2 is not controlled for reducing the tooth hitting noise as in the conventional technique and the sliding member 120 only slides within a minute sliding stroke corresponding to the circumferential gap GP1 when a relative rotation direction between the power transmission shaft 20 and the second rotor shaft 22 is reversed, almost no energy loss is caused by the sliding of the sliding member 120 and the reduction in the tooth hitting noise can be achieved without causing deterioration in fuel efficiency or drivability of the vehicle 6. Although it may be contemplated that the reduction in the tooth hitting noise etc. is achieved by the damper device 26 or an increase in inertia force of a power transmission system, if the sliding member 120 is disposed to achieve the reduction in the tooth hitting noise etc. as in this example, a rise in cost can be suppressed and a vehicle weight can be restrained from increasing.

(A2) According to this example, the sliding member 120 slides relative to the second rotor shaft 22 when the second electric motor MG2 is in a no-load state, i.e., in an idling state. Therefore, since the tooth hitting noise from the power transmission shaft 20 and the second rotor shaft 22 tends to occur when the second electric motor MG2 is in the idling state, the reduction in the tooth hitting noise can effectively be achieved. As compared to the case that the sliding member 120 always slides, wear of the sliding member 120 can be suppressed.

(A3) According to this example, the sliding member 120 is disposed on the third axial center C3 while being pressed by the power transmission shaft 20 and the second rotor shaft 22. Therefore, a configuration of setting the frictional resistance due to the sliding of the sliding member 120 to proper magnitude can easily be established in the power transmission device 10.

(A4) According to this example, the power transmission shaft 20 includes the reduction gear 70, and the counter driven gear 72 mutually meshing with the reduction gear 70 is disposed on the counter shaft 18 making up a portion of the power transmission path (engine power transmission path)

from the engine 8 to the drive wheels 9. The rotor 90 of the second electric motor MG2 has the inertia moment around the third axial center C3 larger than the power transmission shaft 20. Therefore, as compared to the case that the rotor 90 of the second electric motor MG2 has the inertia moment smaller than, for example, the power transmission shaft 20, the larger inertia moment can be applied to the power transmission shaft 20 by the sliding of the sliding member 120 when the power transmission shaft 20 generates rotational vibrations around the third axial center C3. As a result, for example, the tooth hitting noise generated between the reduction gear 70 and the counter driven gear 72 is reduced and pulsation of engine torque transmitted by the counter shaft 18 is suppressed. The pulsation of engine torque, i.e., the pulsation of engine rotation speed is transmitted via the differential gear 24 and the axles etc., to the drive wheels 9 and vibrates a steel plate (e.g., exterior steel plate) making up a vehicle body, causing so-called booming noise. Therefore, the booming noise can be reduced.

(A5) According to this example, the sliding member 120 is an elastic body. Therefore, it is advantageous that the sliding member 120 may not have complicated structure and that the frictional resistance of the sliding member 120 is easily set to magnitude appropriate for achieving the reduction in the tooth hitting noise and the booming noise.

(A6) According to this example, the outer circumferential teeth 20a and the inner circumferential teeth 22a are not included in the engine power transmission path from the engine 8 to the drive wheels 9. In short, the power transmission shaft 20 and the second rotor shaft 22 are not included in the engine power transmission path. The torque of the second electric motor MG2 is transmitted from the power transmission shaft 20 to the second rotor shaft 22 and supplied to the engine power transmission path by the limitation of the relative rotation between the power transmission shaft 20 and the second rotor shaft 22, i.e., the spline fitting between the power transmission shaft 20 and the second rotor shaft 22. In particular, the torque is supplied to the counter shaft 18 making up a portion of the engine power transmission path. Therefore, the outer circumferential teeth 20a and the inner circumferential teeth 22a tend to generate the tooth hitting noise when the torque of the second electric motor MG2 is zero or substantially zero and the tooth hitting noise can properly be reduced in such a configuration.

If the torque of the second electric motor MG2 is zero or substantially zero, it is also expected that the tooth hitting noise occurs between the reduction gear 70 and the counter driven gear 72 due to the torque pulsation of the engine 8 or that since the reduction gear 70 and the counter driven gear 72 are helical gears, the power transmission shaft 20 axially vibrates to generate vibration noise between the seventh bearing 78 and the housing 12a. However, since the power transmission device 10 has the rotor 90 and the second rotor shaft 22 acting as a flywheel and the sliding member 120 sliding relative to the second rotor shaft 22, these tooth hitting and vibrating noises can be reduced. Magnitude of frictional resistance during sliding of the sliding member 120 relative to the second rotor shaft 22 is preliminarily empirically determined such that the tooth hitting and vibrating noises are reduced to a level at which an occupant does not feel uncomfortable. In this regard, consideration is given to the fact that if the frictional resistance is too large, the sliding of the sliding member 120 is not caused by minute vibrations, resulting in insufficient reduction of the tooth hitting noise and increase of wear in the sliding member 120 etc., and that, conversely, if the frictional resistance is too small, this is equivalent to a case when the sliding member 120 is not disposed.

Another example of the present invention will be described. In the following description, the portions mutually common to the examples are denoted by the same reference numerals and will not be described.

Second Example

Figure 7:
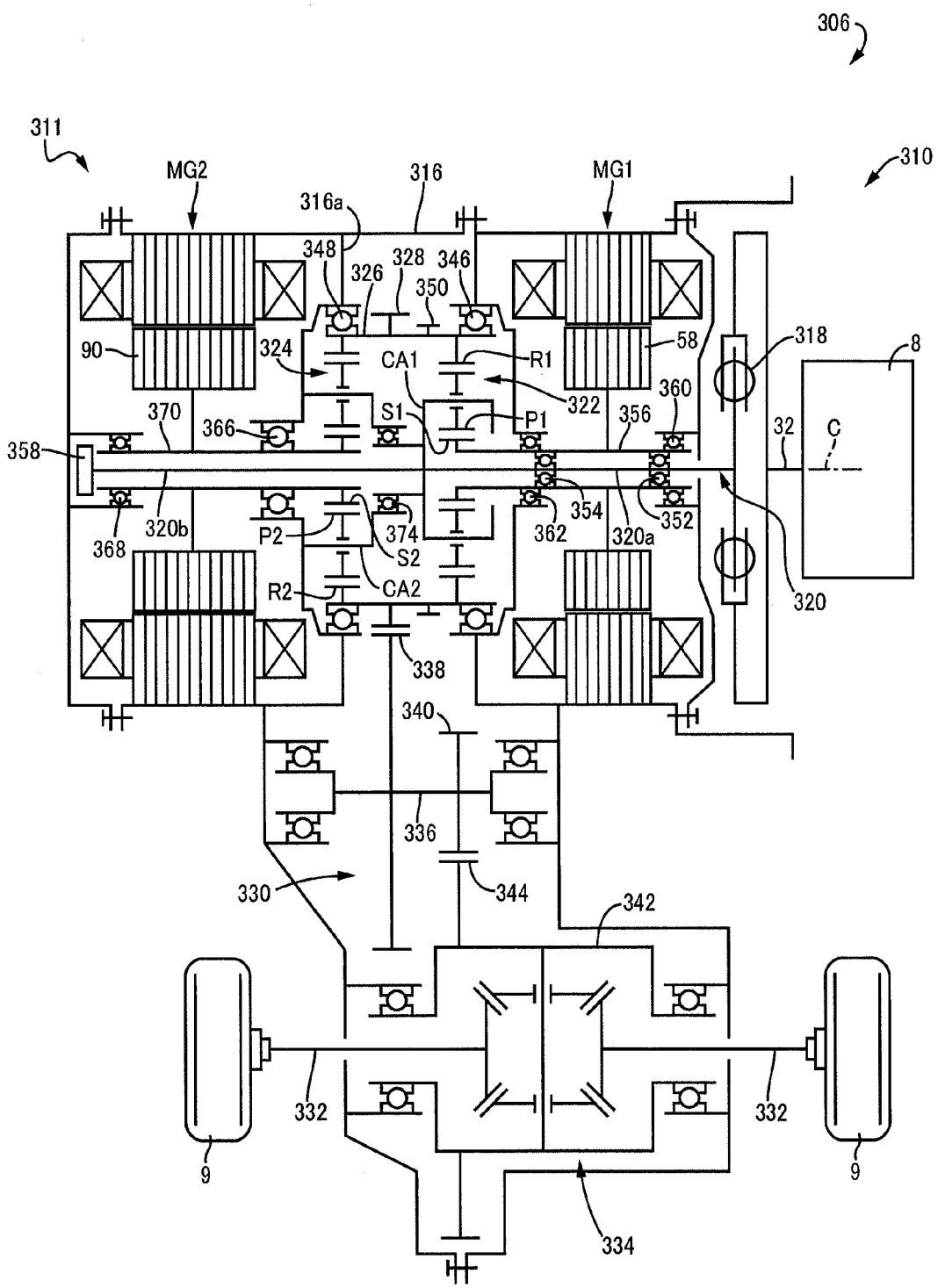
FIG. 7 is a schematic for explaining a configuration of a hybrid vehicle drive device disposed on a hybrid vehicle of the second example to which the present invention is applied.

FIG. 7 is a schematic for explaining a configuration of a hybrid vehicle drive device 310 (hereinafter referred to as a drive device 310) disposed on a hybrid vehicle 306 (hereinafter referred to as a vehicle 306) of a second example to which the present invention is applied. In FIG. 7, the drive device 310 is disposed on an FF (front-engine front-drive) type hybrid vehicle, for example. The drive device 310 is for the purpose of rotationally driving the drive wheels 9 and includes the engine 8 and a vehicle power transmission device 311 (hereinafter referred to as a power transmission device 311). The power transmission device 311 is coupled to an output shaft (crankshaft) 32 of the engine 8 and includes a damper device 318 absorbing pulsation due to torque variation etc. from the engine 8, a power transmission shaft 320 coupled via the damper device 318 to the engine 8, and a transaxle case 316 that is a casing body of the power transmission device 311. The power transmission device 311 also includes, in order from the damper device 318 side, the first electric motor MG1, a power distribution planetary gear device 322 acting as a first planetary gear device, a deceleration planetary gear device 324 acting as a second planetary gear device, and the second electric motor MG2 corresponding to an electric motor of the present invention, which are housed in the transaxle case 316 concentrically with the damper device 318 and the power transmission shaft 320 on an outer circumferential side of the power transmission shaft 320. The damper device 318, the power transmission shaft 320, the first electric motor MG1, the power distribution planetary gear device 322, the deceleration planetary gear device 324, and the second electric motor MG2 are disposed on a common axial center line C. The axial center line C corresponds to one axial center of the present invention. The transaxle case 316 corresponds to a second member of the present invention.

The power distribution planetary gear device 322 is a single pinion type planetary gear device having a first sun gear S1 coupled to the first electric motor MG1, a first ring gear R1 integrally disposed at an end portion on the power distribution planetary gear device 322 side of a cylindrical output member 326 disposed on an outer circumferential side of the power distribution planetary gear device 322 and the deceleration planetary gear device 324, multiple first pinions P1 each meshed with the first sun gear S1 and the first ring gear R1 on an outer circumferential side of the first sun gear S1 and on an inner circumferential side of the first ring gear R1, and a first carrier CA1 coupled to the power transmission shaft 320 and supporting each of the multiple first pinions P1 rotatably and revolvably around the axial center line C. The power distribution planetary gear device 322 acts as a power distribution mechanism mechanically distributing the power from the engine 8 to the first electric motor MG1 and the cylindrical output member 326 and is disposed adjacently to the damper device 318 side of the deceleration planetary gear device 324 on an inner circumferential side of the cylindrical output member 326. The power of the engine 8 distributed by the power distribution planetary gear device 322 to the first electric motor MG1 is used for driving the first electric motor MG1 as an electric generator. The power of the engine 8 distributed by the power distribution planetary gear device 322 to the cylindrical output member 326 is used for rotationally driving the drive wheels 9. An intermediate portion of the cylindrical output member 326 in the axial center line C direction is integrally disposed with a first drive gear 328 consisting of outer circumferential teeth located between the first ring gear R1 of the power distribution planetary gear device 322 and a second ring gear R2 of the deceleration planetary gear device 324 in the axial center line C direction.

The first electric motor MG1 is a first motor generator and is driven by the engine 8 via the power distribution planetary gear device 322 to act as an electric generator and charges, for example, an electric storage device such as a battery with electric energy generated by electric generation. The first electric motor MG1 drives the engine 8 via the power distribution planetary gear device 322, for example, at the engine start, thereby acting as an engine-starting electric motor (engine starter).

A differential state of the power distribution planetary gear device 322 is continuously varied by controlling an operating state of the first electric motor MG1. Therefore, the power distribution planetary gear device 322 and the first electric motor MG1 make up an electric transmission portion controlling the operating state of the first electric motor MG1 to continuously vary the differential state of the power distribution planetary gear device 322, thereby varying a rotation speed of the cylindrical output member 326 in a stepless manner. The first drive gear 328 formed in the cylindrical output member 326 acts as an output gear, i.e., an output rotating member, of the electric transmission portion.

The deceleration planetary gear device 324 is a single pinion type planetary gear device having a second sun gear S2 coupled to the second electric motor MG2, the second ring gear R2 integrally disposed at an end portion of the cylindrical output member 326 closer to the deceleration planetary gear device 324, multiple second pinions P2 each meshed with the second sun gear S2 and the second ring gear R2 on an outer circumferential side of the second sun gear S2 and on an inner circumferential side of the second ring gear R2, and a second carrier CA2 supporting each of the multiple second pinions P2 rotatably and revolvably around the axial center line C. The deceleration planetary gear device 324 outputs the power of the second electric motor MG2 input to the second sun gear S2, from the second ring gear R2 toward the drive wheels 9. The second carrier CA2 is relatively non-rotatably spline-fitted to the transaxle case 316 that is a non-rotating member. Therefore, the deceleration planetary gear device 324 acts as a reduction gear of the second electric motor MG2. The deceleration planetary gear device 324 corresponds to a planetary gear device of the present invention; the second sun gear S2 corresponds to a sun gear of the present invention; the second ring gear R2 corresponds to a ring gear of the present invention; and the second carrier CA corresponds to a carrier and a first member of the present invention.

The second electric motor MG2 is a second motor generator and is caused to act as prime mover rotationally driving the drive wheels 9 solely or along with the engine 8. The second electric motor MG2 is driven by the drive wheels 9 to act as an electric generator, for example, during deceleration of the vehicle, and charges, for example, the electric storage device such as a battery with electric energy generated by electric generation.

The power transmission device 311 also includes a reduction gear device 330 reducing and outputting the rotation speed of the cylindrical output member 326, and a well-known differential gear device 334 distributing power transmitted from the reduction gear device 330 to a pair of left and right axles 332 while allowing a rotation difference therebetween. The reduction gear device 330 has a counter shaft 336 disposed in parallel with the power transmission shaft 320, a first driven gear 338 disposed integrally with the counter shaft 336 and meshed with the first drive gear 328, and a second drive gear 340 disposed integrally with the counter shaft 336. The differential gear device 334 has a differential case 342, and a second driven gear 344 fixed to an outer circumferential side of the differential case 342 and meshed with the second drive gear 340.

In the drive device 310 configured as described above, the power of the engine 8 is input via the damper device 318 to the power transmission shaft 320 and is transmitted from the power transmission shaft 320 sequentially through the power distribution planetary gear device 322, the reduction gear device 330, the differential gear device 334, the pair of the axles 332, etc., to a pair of the drive wheels 9. Therefore, the power transmission device 311 has the power transmission shaft 320, the power distribution planetary gear device 322, the reduction gear device 330, and the differential gear device 334 making up the engine power transmission path that is the power transmission path from the engine 8 to the drive wheels 9. The torque of the second electric motor MG2, i.e., the power of the second electric motor MG2, is supplied via the deceleration planetary gear device 324 to the first drive gear 328 making up a portion of the engine power transmission path. Therefore, the power of the second electric motor MG2 is transmitted from a second rotor shaft 370 sequentially through the deceleration planetary gear device 324, the first drive gear 328, the reduction gear device 330, the differential gear device 334, the pair of the axles 332, etc., to the pair of the drive wheels 9.

The drive device 310 uses the first electric motor MG1 to start the engine 8 at the engine start, for example. At the start of the vehicle 306, the drive device 310 uses the second electric motor MG2 to drive the drive wheels 9. During steady running of the vehicle 306, the drive device 310 distributes the power of the engine 8 through the power distribution planetary gear device 322 to the cylindrical output member 326 and the first electric motor MG1 to drive the drive wheels 9 with one power portion distributed to the cylindrical output member 326 and to cause the first electric motor MG1 to generate power with the other power portion distributed to the first electric motor MG1, and drives the second electric motor MG2 with the electric power acquired from the electric generation to assist the power of the engine 8. During deceleration and braking of the vehicle 306, the drive device 310 allows power transmitted from the drive wheels 9 to rotate the second electric motor MG2 for electric generation, thereby converting kinetic energy into electric energy and collecting the electric energy into an electric storage device.

Figure 8:
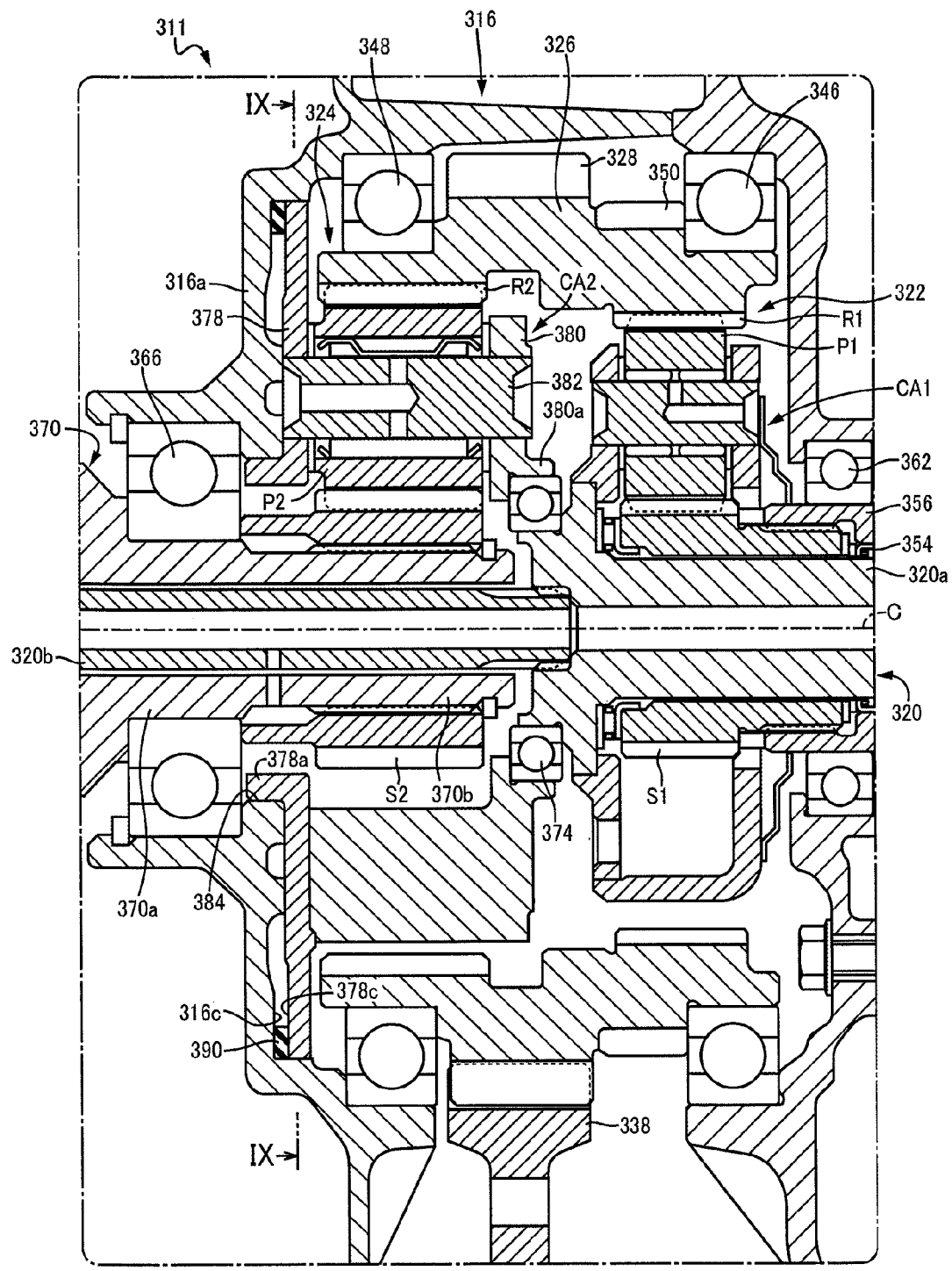
FIG. 8 is an enlarged cross-sectional view of a portion of the vehicle power transmission device of FIG. 7 including the power distribution planetary gear device, the deceleration planetary gear device, and the cylindrical output member.

FIG. 8 is an enlarged cross-sectional view of a portion of the power transmission device 311 of FIG. 7 including the power distribution planetary gear device 322, the deceleration planetary gear device 324, and the cylindrical output member 326. A supporting structure of the second carrier CA2 will be described in detail with reference to FIGS. 7 and 8.

The cylindrical output member 326 is a cylindrical member disposed on the outer circumferential side of the power distribution planetary gear device 322 and the deceleration planetary gear device 324 disposed adjacently to each other on the axial center line C and is supported rotatably around the axial center line C by the transaxle case 316 via a pair of first and second radial ball bearings 346 and 348 disposed respectively on an outer circumferential side of both end portions of the cylindrical output member 326 in the axial center line C direction. The first ring gear R1 and the second ring gear R2 are respectively integrally disposed on an inner circumferential side of both end portions of the cylindrical output member 326 in the axial center line C direction, and the first drive gear 328 and a parking lock gear 350 are respectively integrally disposed on an outer circumferential side of intermediate portions of the cylindrical output member 326 in the axial center line C direction. In short, the cylindrical output member 326 is a composite gear member integrally disposed with the first ring gear R1, the second ring gear R2, the first drive gear 328, and the parking lock gear 350.

The power transmission shaft 320 is made up of a large diameter portion 320a and a small diameter portion 320b serially coupled to each other on the axial center line C by spline fitting in a relatively non-rotatable manner. The large diameter portion 320a of the power transmission shaft 320 has both end portions respectively coupled to the damper device 318 and the first carrier CA1 and is supported by a first rotor shaft 356 of the first electric motor MG1 via a first needle roller bearing 352 (see FIG. 7) and a second needle roller bearing 354. The small diameter portion 320b of the power transmission shaft 320 acts as a pump drive shaft of an oil pump 358 (see FIG. 7) and one end portion of the small diameter portion 320b is integrally fixed by spline fitting to an inner circumferential surface of an end portion of the large diameter portion 320a closer to the first carrier CA1 while the other end portion is coupled to the mechanical oil pump 358.

The first rotor shaft 356 is supported by the transaxle case 316 via a third radial ball bearing 360 (see FIG. 7) and a fourth radial ball bearing 362 separated in the axial center line C direction. The rotor (first rotor) 58 of the first electric motor MG1 is fixed to the first rotor shaft 356 between the third radial ball bearing 360 and the fourth radial ball bearing 362 as depicted in FIG. 7.

The second rotor shaft 370 is rotatably supported at both end portions on an outer circumferential side of the small diameter portion 320b of the power transmission shaft 320 by a fifth radial ball bearing 366 and a sixth radial ball bearing 368 (see FIG. 7) separated in the axial center line C direction. The rotor (second rotor) 90 of the second electric motor MG2 is fixed to the second rotor shaft 370 between the fifth radial ball bearing 366 and the sixth radial ball bearing 368 as depicted in FIG. 7. The fifth radial ball bearing 366 is a bearing fitted to a cylindrical inner circumferential surface of a wall portion 316a of the transaxle case 316 disposed on the deceleration planetary gear device 324 side of the second electric motor MG2.

The second rotor shaft 370 has a cantilever-shaped sun gear fitting portion 370b extending out through the wall portion 316a from an end portion 370a on the wall portion 316a side of the both end portions of the second rotor shaft 370.

The second sun gear S2 of the deceleration planetary gear device 324 is integrally fixed by spline fitting to the sun gear fitting portion 370b of the second rotor shaft 370. As depicted in FIG. 8, the fifth radial ball bearing 366 and the second sun gear S2 are fitted to the sun gear fitting portion 370b of the second rotor shaft 370 in this order from the end portion 370a side of the second rotor shaft 370 toward a leading end of the sun gear fitting portion 370b. An inner ring of the fifth radial ball bearing 366 is brought into contact with an end surface of a stepped portion of the second rotor shaft 370, and the fifth radial ball bearing 366 and the second sun gear S2 are brought into contact with each other in the axial center line C direction.

The second carrier CA2 of the deceleration planetary gear device 324 includes a first carrier member 378 making up one end portion closer to the second electric motor MG2 in the axial center line C direction, a second carrier member 380 making up the other end portion, and a carrier pin 382 rotatably supporting the second pinions P2. The first carrier member 378 is supported by the wall portion 316a of the transaxle case 316 and the second carrier member 380 is supported via a seventh radial ball bearing 374 by the large diameter portion 20a of the power transmission shaft 20. The first carrier member 378 is a circular plate-shaped member supporting an end portion of the carrier pin 382 closer to the second electric motor MG2. The first carrier member 378 has a first cylindrical projecting portion 378a projected toward the second electric motor MG2 and fitted to a cylindrical inner circumferential surface 384 of the wall portion 316a of the transaxle case 316.

The second carrier member 380 is a circular plate-shaped member supporting an end portion of the carrier pin 382 closer to the power distribution planetary gear device 322. The second carrier member 380 has a second cylindrical projecting portion 380a projected toward the power distribution planetary gear device 322 and supported via the seventh radial ball bearing 374 by the large diameter portion 20a of the power transmission shaft 20.

Figure 9:
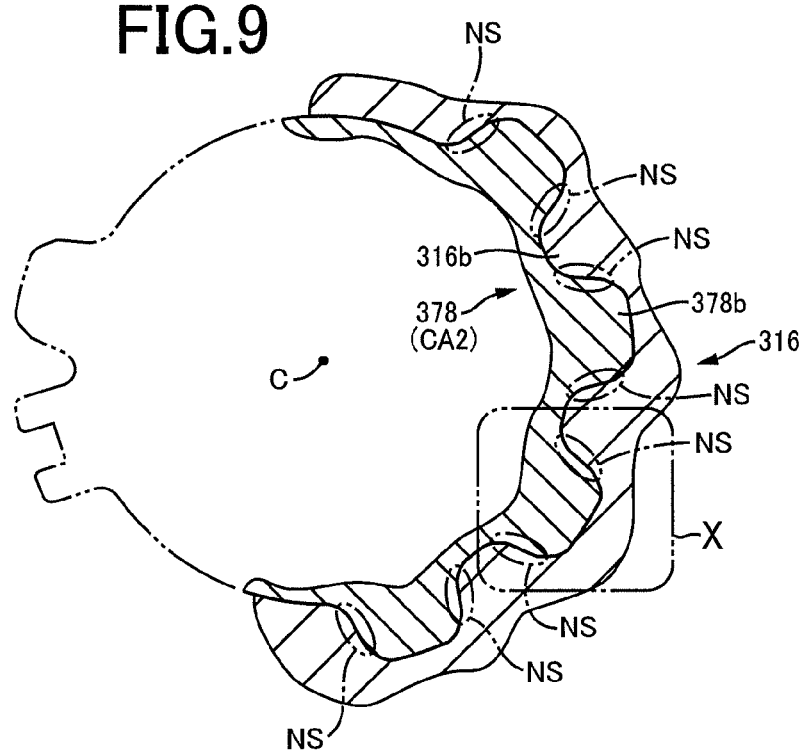
FIG. 9 is a cross-sectional view of a spline fitting portion between the transaxle case of FIG. 8 and the first carrier member included in the second carrier, i.e., a cross-sectional view of the transaxle case and the first carrier member viewed along IX-IX of FIG. 8.
Figure 10:
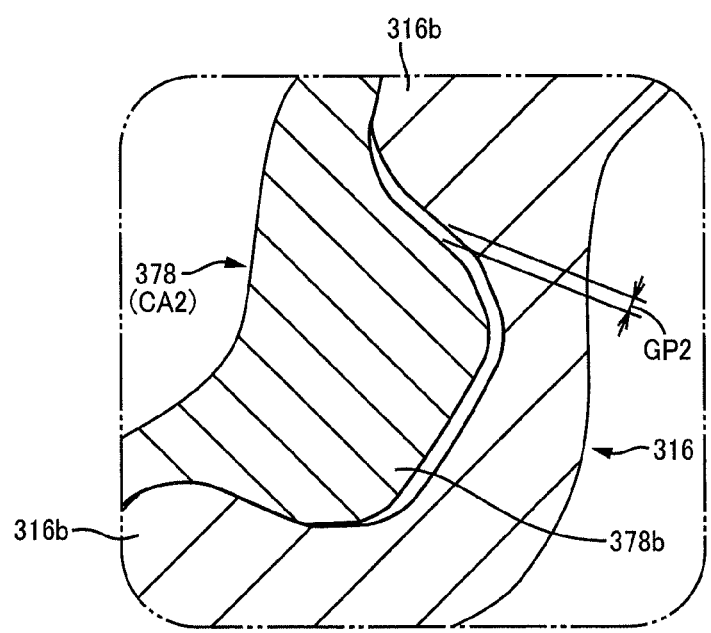
FIG. 10 is an enlarged view of a portion X of FIG. 9.

FIG. 9 is a cross-sectional view of a spline fitting portion between the transaxle case 316 and the first carrier member 378 included in the second carrier CA2, i.e., a cross-sectional view of the transaxle case 316 and the first carrier member 378 viewed along IX-IX of FIG. 8. FIG. 10 is an enlarged view of a portion X of FIG. 9. The transaxle case 316 and the second carrier CA2 are spline-fitted to each other as described with reference to FIG. 7 and the spline fitting will be described in detail with reference to FIGS. 8 to 10. As depicted in FIG. 9, the first carrier member 378 includes a plurality of outer circumferential teeth 378b arranged around the axial center line C and the transaxle case 316 includes a plurality of inner circumferential teeth 316b arranged around the axial center line C. The outer circumferential teeth 378b and the inner circumferential teeth 316b mesh with each other, and the mashing between the outer circumferential teeth 378b and the inner circumferential teeth 316b makes up the spline fitting. The spline fitting between the first carrier member 378 and the transaxle case 316 is loose fitting and, as depicted in FIG. 10, a minute gap GP2 (hereinafter referred to as a circumferential gap GP2) exists in a circumferential direction around the axial center line C between the outer circumferential teeth 378b and the inner circumferential teeth 316b. Therefore, it has been described that the second carrier CA2 is relatively non-rotatably spline-fitted to the transaxle case 316 in the description of FIG. 7; however, strictly speaking, the first carrier member 378 of the second carrier CA2 and the transaxle case 316 are rotatable around the axial center line C within a range corresponding to the circumferential gap GP2. In other words, accurately describing the spline fitting between the first carrier member 378 of the second carrier CA2 and the transaxle case 316, a relative rotation around the axial center line C between the first carrier member 378 and the transaxle case 316 is limited by the outer circumferential teeth 378b and the inner circumferential teeth 316b meshing with each other. The torque of the second electric motor MG2 is transmitted from the second sun gear S2 to the second ring gear R2 by the limitation of the relative rotation between the first carrier member 378 and the transaxle case 316, i.e., the spline fitting between the second carrier CA2 and the transaxle case 316. In other words, the torque is transmitted from the second rotor shaft 370 to the drive wheels 9.

As depicted in FIG. 8, the power transmission device 311 includes an annular sliding member 390 having an axial center that is the axial center line C, between an inner side surface 316c of the wall portion 316a of the transaxle case 316 and a side surface 378c of the first carrier member 378 opposed to the inner side surface 316c in the axial center line C direction. The sliding member 390 is a member disposed for reducing tooth hitting noise generated by the outer circumferential teeth 378b and the inner circumferential teeth 316b circumferentially colliding with each other at portions NS of FIG. 9. The sliding member 390 is the same as the sliding member 120 of the first example except for a shape, has a rectangular cross section, for example, and is made up of an elastic body such as high wear resistance rubber. To increase frictional resistance at the time of sliding, a surface of the sliding member 390 is made up of a rough surface. The sliding member 390 is fixedly disposed on the inner side surface 316c of the transaxle case 316, for example. To acquire frictional resistance at the time of sliding, the sliding member 390 is sandwiched and pressed by the first carrier member 378 and the transaxle case 316 such that the sliding member 390 is compressed in the direction parallel to the axial center line C.

Since the sliding member 390 is mounted on the axial center line C in this way, the sliding member 390 slightly slides while generating frictional resistance to the second carrier CA2 as the second carrier CA2 relatively rotates relative to the transaxle case 316 around the axial center line C within the range corresponding to the circumferential gap GP2 (see FIG. 10). In particular, the sliding member 390 slides relative to the side surface 378c of the first carrier member 378 in the circumferential direction around the axial center line C. However, during the driving or the regenerative operation of the second electric motor MG2, if torque is transmitted through the deceleration planetary gear device 324, torque for making the second carrier CA2 rotate unidirectionally is added to the second carrier CA2 and the outer circumferential teeth 378b and the inner circumferential teeth 316b are pressed to each other in one of the circumferential directions and, therefore, the sliding member 390 does not slide relative to the first carrier member 378. Thus, the sliding member 390 slides relative to the second carrier CA2 i.e. first carrier member 378 depending on magnitude of the torque of the second electric motor MG2. Specifically, when the second electric motor MG2 is idling, the sliding member 390 slides relative to the second carrier CA2.

The power transmission device 311 of this example can produce the same effects as the effects (A1) to (A3), (A5), and (A6) of the first example.

Although the examples of the present invention have been described in detail with reference to the drawings, the present invention is applicable in other forms.

For example, although the sliding member 120, 390 is made of rubber etc. in the first and second examples, the sliding member may be made of resin, a disk spring, or friction material frequently used for a brake etc., as long as frictional resistance is generated. Although the sliding member 120, 390 is made up of a single member made of rubber etc., the sliding member may be a composite member made up of a multiplicity of members rather than a single member.

Although the sliding member 120, 390 is pressed to be compressed by adjacent members on the both sides in the first and second examples, the sliding member may not be pressed to be compressed in this way given that frictional resistance is generated at the time of sliding.

Although the sliding member 120, 390 is axially pressed by adjacent members in the first and second examples, the sliding member may radially be pressed.

Although the sliding member 120, 390 is an annular member in the first and second examples, an external shape is not particularly limited and the sliding member may partially be disposed rather than entirely around the third axial center C3 or the axial center line C. Although a cross-sectional shape of the sliding member 120, 390 is rectangular, the sliding member may be circular, hexagonal or may be a hollow member.

Although the vehicle 6, 306 includes the first electric motor MG1 in the first and second examples, the vehicle may not include the first electric motor MG1.

Although the sliding member 120 slides relative to a rotating member having the very large inertia moment made up of the second rotor shaft 22 and the rotor 90 of the second electric motor MG2 in the first example, the sliding member may additionally slide relative to a non-rotating member as in the case of the sliding member 390 of the second example.

Although the power transmission shaft 20 includes the outer circumferential teeth 20a making up spline fitting and the second rotor shaft 22 includes the inner circumferential teeth 22a making up the spline fitting in the first example, conversely, the power transmission shaft 20 may include the inner circumferential teeth and the second rotor shaft 22 may include the outer circumferential teeth.

Although the first carrier member 378 includes the outer circumferential teeth 378b making up spline fitting and the transaxle case 316 includes the inner circumferential teeth 316b making up the spline fitting in the second example, conversely, the first carrier member 378 may include the inner circumferential teeth and the transaxle case 316 may include the outer circumferential teeth.

Although the sliding member 120 slides relative to the second rotor shaft 22 in the first example, the sliding member may slide relative to the power transmission shaft 20 instead of the second rotor shaft 22 or may slide relative to both the power transmission shaft 20 and the second rotor shaft 22. The same applies to the sliding member 390 of the second example.

The above description is merely an embodiment and the present invention may be implemented in variously modified and improved forms based on the knowledge of those skilled in the art.

NOMENCLATURE OF ELEMENTS 6, 306: vehicle (hybrid vehicle) 8: engine 9: drive wheels 10, 311: power transmission device (vehicle power transmission device) 18: counter shaft (transmission shaft) 20: power transmission shaft (first member) 20a: outer circumferential teeth 22: second rotor shaft (electric motor rotor shaft, second member) 22a: inner circumferential teeth 70: reduction gear (driving gear) 72: counter driven gear (driven gear) 90: rotor 120, 390: sliding member 316: transaxle case (second member) 316b: inner circumferential teeth 324: deceleration planetary gear device (planetary gear device) 378b: outer circumferential teeth C3: third axial center (one axial center) C: axial center line (one axial center) CA2: second carrier (carrier, first member) R2: second ring gear (ring gear) S2: second sun gear (sun gear) MG2: second electric motor (electric motor)

The invention claimed is:

1. A vehicle power transmission device disposed on a hybrid vehicle having an engine and an electric motor, the vehicle power transmission device including a first member having one of outer circumferential teeth disposed around one axial center or inner circumferential teeth meshing with the outer circumferential teeth and a second member having the other teeth, the inner circumferential teeth and the outer circumferential teeth meshing with each other to limit relative rotation around the one axial center between the first member and the second member, the relative rotation between the first member and the second member being limited to transmit torque of the electric motor to drive wheels, the vehicle power transmission device comprising:

a sliding member sliding relative to at least one of the first member and the second member while generating frictional resistance as the first member and the second member relatively rotate within a range corresponding to a circumferential gap between the outer circumferential teeth and the inner circumferential teeth, the sliding member being a hollow elastic body, the sliding member sliding relative to at least one of the first member and the second member depending on magnitude of the torque of the electric motor, the first member including a driving gear, a driven gear mutually meshing with the driving gear being disposed on a transmission shaft making up a portion of a power transmission path from the engine to the drive wheels, the second member including an electric motor rotor shaft relatively non-rotatably fixed to a rotor of the electric motor and the sliding member being pressed by the first member and the second member.

2. The vehicle power transmission device of claim 1, wherein when the electric motor is in an idling state, the sliding member slides relative to at least one of the first member and the second member.

3. The vehicle power transmission device of claim 1, wherein the rotor of the electric motor has an inertia moment around the one axial center larger than the first member.

4. The vehicle power transmission device of claim 1, wherein the outer circumferential teeth and the inner circumferential teeth are not included in the power transmission path from the engine to the drive wheels, and wherein the torque of the electric motor is supplied to the power transmission path by limiting relative rotation between the first member and the second member.

* * * * *